US009711152B2

(12) United States Patent
Neuhauser et al.

(10) Patent No.: US 9,711,152 B2
(45) Date of Patent: Jul. 18, 2017

(54) SYSTEMS APPARATUS AND METHODS FOR ENCODING/DECODING PERSISTENT UNIVERSAL MEDIA CODES TO ENCODED AUDIO

(71) Applicant: The Nielsen Company (US), LLC, Schaumburg, IL (US)

(72) Inventors: Alan Neuhauser, Silver Spring, MD (US); John Stavropoulos, Edison, NJ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 203 days.

(21) Appl. No.: 13/955,245

(22) Filed: Jul. 31, 2013

(65) Prior Publication Data

US 2015/0039320 A1 Feb. 5, 2015

(51) Int. Cl.
*G06F 17/30* (2006.01)
*G10L 19/018* (2013.01)

(52) U.S. Cl.
CPC ...... *G10L 19/018* (2013.01); *G06F 17/30289* (2013.01)

(58) Field of Classification Search
CPC .............................................. G06F 17/30289
USPC ........................................................ 707/802
See application file for complete search history.

(56) References Cited

U.S. PATENT DOCUMENTS

| 4,230,990 | A | 10/1980 | Lert, Jr. et al. |
| 4,647,974 | A | 3/1987 | Butler et al. |
| 4,677,466 | A | 6/1987 | Lert, Jr. et al. |
| 4,697,209 | A | 9/1987 | Kiewit et al. |
| 4,745,468 | A | 5/1988 | Von Kohorn |

(Continued)

FOREIGN PATENT DOCUMENTS

| AU | 8976601 | 2/2002 |
| AU | 9298201 | 4/2002 |

(Continued)

OTHER PUBLICATIONS

European Patent Office, "Examination Report," issued in connection with application No. EP 09 748 892.8-1908, on Dec. 21, 2015 (7 pages).

Patent Cooperation Treaty, "International Search Report and Written Opinion," issued in connection with Application No. PCT/US2014/049202, Nov. 12, 2014, 9 pages.

Fink et al., "Social- and Interactive-Television Applications Based on Real-Time Ambient-Audio Identification," EuroITV, 2006 (10 pages).

United States Patent and Trademark Office, "Non-Final Office Action," issued in connection with U.S. Appl. No. 12/464,811, Aug. 31, 2012, 46 pages.

(Continued)

*Primary Examiner* — Mahesh Dwivedi
*Assistant Examiner* — Johnese Johnson
(74) *Attorney, Agent, or Firm* — Hanley, Flight & Zimmerman, LLC

(57) ABSTRACT

Apparatus, system and method for encoding and/or decoding persistent universal media identification (ID) codes embedded in audio. For encoding, a persistent identifier code is generated or received from a registry database, where the code includes data for uniquely identifying a media object. Audio code components including frequency characteristics are generated to represent symbols of the persistent identifier code and the audio code components are psychoacoustically embedded into an audio portion of the media object to include the persistent identifier code within one or more of a plurality of encoding layers. Such embedded audio may be subsequently decoded by transforming the audio data into a frequency domain and processing the transformed audio data to detect the persistent identifier code.

21 Claims, 6 Drawing Sheets

(56) References Cited

U.S. PATENT DOCUMENTS

| | | |
|---|---|---|
| 4,876,592 A | 10/1989 | Von Kohorn |
| 4,876,736 A | 10/1989 | Kiewit |
| 4,926,255 A | 5/1990 | Von Kohorn |
| 4,973,952 A | 11/1990 | Malec et al. |
| 5,019,899 A | 5/1991 | Boles et al. |
| 5,023,929 A | 6/1991 | Call |
| 5,034,807 A | 7/1991 | Von Kohorn |
| 5,057,915 A | 10/1991 | Von Kohorn |
| 5,081,680 A | 1/1992 | Bennett |
| 5,128,752 A | 7/1992 | Von Kohorn |
| 5,157,489 A | 10/1992 | Lowe |
| 5,227,874 A | 7/1993 | Von Kohorn |
| 5,245,665 A | 9/1993 | Lewis et al. |
| 5,249,044 A | 9/1993 | Von Kohorn |
| 5,283,734 A | 2/1994 | Von Kohorn |
| 5,331,544 A | 7/1994 | Lu et al. |
| 5,401,946 A | 3/1995 | Weinblatt |
| 5,425,100 A | 6/1995 | Thomas et al. |
| 5,450,490 A | 9/1995 | Jensen et al. |
| 5,453,790 A | 9/1995 | Vermeulen et al. |
| 5,481,294 A | 1/1996 | Thomas et al. |
| 5,512,933 A | 4/1996 | Wheatley et al. |
| 5,524,195 A | 6/1996 | Clanton, III et al. |
| 5,543,856 A | 8/1996 | Rosser et al. |
| 5,574,962 A | 11/1996 | Fardeau et al. |
| 5,579,124 A | 11/1996 | Aijala et al. |
| 5,581,800 A | 12/1996 | Fardeau et al. |
| 5,594,934 A | 1/1997 | Lu et al. |
| 5,629,739 A | 5/1997 | Dougherty |
| 5,659,366 A | 8/1997 | Kerman |
| 5,666,293 A | 9/1997 | Metz et al. |
| 5,682,196 A | 10/1997 | Freeman |
| 5,719,634 A | 2/1998 | Keery et al. |
| 5,734,413 A | 3/1998 | Lappington et al. |
| 5,740,035 A | 4/1998 | Cohen et al. |
| 5,764,763 A | 6/1998 | Jensen et al. |
| 5,787,334 A | 7/1998 | Fardeau et al. |
| 5,815,671 A | 9/1998 | Morrison |
| 5,841,978 A | 11/1998 | Rhoads |
| 5,848,155 A | 12/1998 | Cox |
| 5,850,249 A | 12/1998 | Massetti et al. |
| 5,872,588 A | 2/1999 | Aras et al. |
| 5,878,384 A | 3/1999 | Johnson et al. |
| 5,880,789 A | 3/1999 | Inaba |
| 5,893,067 A | 4/1999 | Bender et al. |
| 5,918,223 A | 6/1999 | Blum et al. |
| 5,930,369 A | 7/1999 | Cox et al. |
| 5,933,789 A | 8/1999 | Byun et al. |
| 5,956,716 A | 9/1999 | Kenner et al. |
| 5,956,743 A | 9/1999 | Bruce et al. |
| 5,966,120 A | 10/1999 | Arazi et al. |
| 5,974,396 A | 10/1999 | Anderson et al. |
| 5,978,855 A | 11/1999 | Metz et al. |
| 5,987,855 A | 11/1999 | Dey et al. |
| 6,034,722 A | 3/2000 | Viney et al. |
| 6,035,177 A | 3/2000 | Moses et al. |
| 6,049,830 A | 4/2000 | Saib |
| 6,055,573 A | 4/2000 | Gardenswartz et al. |
| 6,154,209 A | 11/2000 | Naughton et al. |
| 6,208,735 B1 | 3/2001 | Cox et al. |
| 6,216,129 B1 | 4/2001 | Eldering |
| 6,286,036 B1 | 9/2001 | Rhoads |
| 6,286,140 B1 | 9/2001 | Ivanyi |
| 6,298,348 B1 | 10/2001 | Eldering |
| 6,308,327 B1 | 10/2001 | Liu et al. |
| 6,331,876 B1 | 12/2001 | Koster et al. |
| 6,335,736 B1 | 1/2002 | Wagner et al. |
| 6,363,159 B1 | 3/2002 | Rhoads |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,487,564 B1 | 11/2002 | Asai et al. |
| 6,505,160 B1 | 1/2003 | Levy et al. |
| 6,512,836 B1 | 1/2003 | Xie et al. |
| 6,513,014 B1 | 1/2003 | Walker et al. |
| 6,522,771 B2 | 2/2003 | Rhoads |
| 6,539,095 B1 | 3/2003 | Rhoads |
| 6,546,556 B1 | 4/2003 | Kataoka et al. |
| 6,553,178 B2 | 4/2003 | Abecassis |
| 6,642,966 B1 | 11/2003 | Limaye |
| 6,647,269 B2 | 11/2003 | Hendrey et al. |
| 6,651,253 B2 | 11/2003 | Dudkiewicz et al. |
| 6,654,480 B2 | 11/2003 | Rhoads |
| 6,665,873 B1 | 12/2003 | Van Gestel et al. |
| 6,675,383 B1 | 1/2004 | Wheeler et al. |
| 6,683,966 B1 | 1/2004 | Tian et al. |
| 6,687,663 B1 | 2/2004 | McGrath et al. |
| 6,710,815 B1 | 3/2004 | Billmaier et al. |
| 6,714,683 B1 | 3/2004 | Tian et al. |
| 6,741,684 B2 | 5/2004 | Kaars |
| 6,748,362 B1 | 6/2004 | Meyer et al. |
| 6,750,985 B2 | 6/2004 | Rhoads |
| 6,766,523 B2 | 7/2004 | Herley |
| 6,795,972 B2 | 9/2004 | Rovira |
| 6,804,379 B2 | 10/2004 | Rhoads |
| 6,829,368 B2 | 12/2004 | Meyer et al. |
| 6,845,360 B2 | 1/2005 | Jensen et al. |
| 6,853,634 B1 | 2/2005 | Davies et al. |
| 6,871,180 B1 | 3/2005 | Neuhauser et al. |
| 6,871,323 B2 | 3/2005 | Wagner et al. |
| 6,873,688 B1 | 3/2005 | Aarnio |
| 6,941,275 B1 | 9/2005 | Swierczek |
| 6,956,575 B2 | 10/2005 | Nakazawa et al. |
| 6,965,601 B1 | 11/2005 | Nakano et al. |
| 6,968,371 B1 | 11/2005 | Srinivasan |
| 6,968,564 B1 | 11/2005 | Srinivasan |
| 6,970,886 B1 | 11/2005 | Conwell et al. |
| 6,996,213 B1 | 2/2006 | De Jong |
| 7,003,731 B1 | 2/2006 | Rhoads et al. |
| 7,006,555 B1 | 2/2006 | Srinivasan |
| 7,050,603 B2 | 5/2006 | Rhoads et al. |
| 7,051,086 B2 | 5/2006 | Rhoads et al. |
| 7,058,697 B2 | 6/2006 | Rhoads |
| 7,082,434 B2 | 7/2006 | Gosselin |
| 7,092,964 B1 | 8/2006 | Dougherty et al. |
| 7,095,871 B2 | 8/2006 | Jones et al. |
| 7,143,949 B1 | 12/2006 | Hannigan |
| 7,158,943 B2 | 1/2007 | Van der Riet |
| 7,171,018 B2 | 1/2007 | Rhoads et al. |
| 7,174,293 B2 | 2/2007 | Kenyon et al. |
| 7,185,201 B2 | 2/2007 | Rhoads et al. |
| 7,194,752 B1 | 3/2007 | Kenyon et al. |
| 7,197,156 B1 | 3/2007 | Levy |
| 7,215,280 B1 | 5/2007 | Percy et al. |
| 7,221,405 B2 | 5/2007 | Basson et al. |
| 7,227,972 B2 | 6/2007 | Brundage et al. |
| 7,254,249 B2 | 8/2007 | Rhoads et al. |
| 7,269,564 B1 | 9/2007 | Milsted et al. |
| 7,273,978 B2 | 9/2007 | Uhle |
| 7,317,716 B1 | 1/2008 | Boni et al. |
| 7,328,153 B2 | 2/2008 | Wells et al. |
| 7,346,512 B2 | 3/2008 | Li-Chun Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,421,723 B2 | 9/2008 | Harkness et al. |
| 7,440,674 B2 | 10/2008 | Plotnick et al. |
| 7,443,292 B2 | 10/2008 | Jensen et al. |
| 7,463,143 B2 | 12/2008 | Forr et al. |
| 7,519,658 B1 | 4/2009 | Anglin et al. |
| 7,592,908 B2 | 9/2009 | Zhang et al. |
| 7,623,823 B2 | 11/2009 | Zito et al. |
| 7,640,141 B2 | 12/2009 | Kolessar et al. |
| 7,761,602 B1 | 7/2010 | Knight et al. |
| RE42,627 E | 8/2011 | Neuhauser et al. |
| 8,229,159 B2 | 7/2012 | Tourapis et al. |
| 8,255,763 B1 | 8/2012 | Yang et al. |
| 8,369,972 B2 | 2/2013 | Topchy et al. |
| 8,768,713 B2 | 7/2014 | Chaoui et al. |
| 8,924,995 B2 | 12/2014 | Ramaswamy et al. |
| 9,015,563 B2 | 4/2015 | Lynch et al. |
| 9,124,769 B2 * | 9/2015 | Srinivasan .............. H04N 7/163 |
| 2001/0044899 A1 | 11/2001 | Levy |

(56) References Cited

U.S. PATENT DOCUMENTS

| | | | |
|---|---|---|---|
| 2001/0056573 A1 | 12/2001 | Kovac et al. | |
| 2002/0032734 A1 | 3/2002 | Rhoads | |
| 2002/0033842 A1 | 3/2002 | Zetts | |
| 2002/0053078 A1 | 5/2002 | Holtz et al. | |
| 2002/0056094 A1 | 5/2002 | Dureau | |
| 2002/0059218 A1 | 5/2002 | August et al. | |
| 2002/0062382 A1 | 5/2002 | Rhoads et al. | |
| 2002/0091991 A1 | 7/2002 | Castro | |
| 2002/0102993 A1 | 8/2002 | Hendrey et al. | |
| 2002/0108125 A1 | 8/2002 | Joao | |
| 2002/0111934 A1 | 8/2002 | Narayan | |
| 2002/0112002 A1 | 8/2002 | Abato | |
| 2002/0124246 A1 | 9/2002 | Kaminsky et al. | |
| 2002/0138851 A1 | 9/2002 | Lord et al. | |
| 2002/0144262 A1 | 10/2002 | Plotnick et al. | |
| 2002/0144273 A1 | 10/2002 | Reto | |
| 2002/0162118 A1 | 10/2002 | Levy et al. | |
| 2002/0174425 A1 | 11/2002 | Markel et al. | |
| 2002/0194592 A1 | 12/2002 | Tsuchida et al. | |
| 2003/0021441 A1 | 1/2003 | Levy et al. | |
| 2003/0039465 A1 | 2/2003 | Bjorgan et al. | |
| 2003/0088674 A1 | 5/2003 | Ullman et al. | |
| 2003/0105870 A1 | 6/2003 | Baum | |
| 2003/0108200 A1 | 6/2003 | Sako | |
| 2003/0115598 A1 | 6/2003 | Pantoja | |
| 2003/0177488 A1 | 9/2003 | Smith et al. | |
| 2003/0185232 A1 | 10/2003 | Moore et al. | |
| 2003/0229900 A1 | 12/2003 | Reisman | |
| 2004/0004630 A1 | 1/2004 | Kalva et al. | |
| 2004/0006696 A1 | 1/2004 | Shin et al. | |
| 2004/0024588 A1 | 2/2004 | Watson et al. | |
| 2004/0031058 A1 | 2/2004 | Reisman | |
| 2004/0037271 A1 | 2/2004 | Liscano et al. | |
| 2004/0038692 A1 | 2/2004 | Muzaffar | |
| 2004/0059918 A1 | 3/2004 | Xu | |
| 2004/0059933 A1 | 3/2004 | Levy | |
| 2004/0064319 A1 | 4/2004 | Neuhauser et al. | |
| 2004/0073916 A1 | 4/2004 | Petrovic et al. | |
| 2004/0073951 A1 | 4/2004 | Bae et al. | |
| 2004/0102961 A1* | 5/2004 | Jensen et al. | 704/201 |
| 2004/0120417 A1 | 6/2004 | Lynch et al. | |
| 2004/0125125 A1 | 7/2004 | Levy | |
| 2004/0128514 A1 | 7/2004 | Rhoads | |
| 2004/0137929 A1 | 7/2004 | Jones et al. | |
| 2004/0143844 A1 | 7/2004 | Brant et al. | |
| 2004/0146161 A1 | 7/2004 | De Jong | |
| 2004/0163020 A1* | 8/2004 | Sidman | 714/100 |
| 2004/0184369 A1 | 9/2004 | Herre et al. | |
| 2004/0199387 A1 | 10/2004 | Wang et al. | |
| 2004/0267533 A1 | 12/2004 | Hannigan et al. | |
| 2005/0028189 A1 | 2/2005 | Heine et al. | |
| 2005/0033758 A1 | 2/2005 | Baxter | |
| 2005/0036653 A1 | 2/2005 | Brundage et al. | |
| 2005/0058319 A1 | 3/2005 | Rhoads et al. | |
| 2005/0086682 A1 | 4/2005 | Burges et al. | |
| 2005/0144004 A1 | 6/2005 | Bennett et al. | |
| 2005/0192933 A1 | 9/2005 | Rhoads et al. | |
| 2005/0216346 A1 | 9/2005 | Kusumoto et al. | |
| 2005/0234728 A1 | 10/2005 | Tachibana et al. | |
| 2005/0234731 A1 | 10/2005 | Sirivara et al. | |
| 2005/0234774 A1 | 10/2005 | Dupree | |
| 2005/0262351 A1 | 11/2005 | Levy | |
| 2005/0271246 A1 | 12/2005 | Sharma et al. | |
| 2006/0059277 A1 | 3/2006 | Zito et al. | |
| 2006/0083403 A1 | 4/2006 | Zhang et al. | |
| 2006/0089912 A1 | 4/2006 | Spagna et al. | |
| 2006/0095401 A1 | 5/2006 | Krikorian et al. | |
| 2006/0107195 A1 | 5/2006 | Ramaswamy et al. | |
| 2006/0107302 A1 | 5/2006 | Zdepski | |
| 2006/0110005 A1 | 5/2006 | Tapson | |
| 2006/0136564 A1 | 6/2006 | Ambrose | |
| 2006/0167747 A1 | 7/2006 | Goodman et al. | |
| 2006/0168613 A1 | 7/2006 | Wood et al. | |
| 2006/0212710 A1 | 9/2006 | Baum et al. | |
| 2006/0221173 A1 | 10/2006 | Duncan | |
| 2006/0224798 A1 | 10/2006 | Klein et al. | |
| 2006/0280246 A1 | 12/2006 | Alattar et al. | |
| 2007/0006250 A1 | 1/2007 | Croy et al. | |
| 2007/0016918 A1 | 1/2007 | Alcorn et al. | |
| 2007/0055987 A1 | 3/2007 | Lu et al. | |
| 2007/0061577 A1 | 3/2007 | Van De Kerkhof et al. | |
| 2007/0064937 A1 | 3/2007 | Van Leest et al. | |
| 2007/0070429 A1 | 3/2007 | Hein et al. | |
| 2007/0104335 A1 | 5/2007 | Shi et al. | |
| 2007/0110089 A1 | 5/2007 | Essafi et al. | |
| 2007/0118375 A1 | 5/2007 | Kenyon et al. | |
| 2007/0124771 A1 | 5/2007 | Shvadron | |
| 2007/0127717 A1 | 6/2007 | Herre et al. | |
| 2007/0129952 A1 | 6/2007 | Kenyon et al. | |
| 2007/0143778 A1 | 6/2007 | Covell et al. | |
| 2007/0149114 A1 | 6/2007 | Danilenko | |
| 2007/0162927 A1 | 7/2007 | Ramaswamy et al. | |
| 2007/0198738 A1 | 8/2007 | Angiolillo et al. | |
| 2007/0201835 A1 | 8/2007 | Rhoads | |
| 2007/0226760 A1 | 9/2007 | Neuhauser et al. | |
| 2007/0240234 A1 | 10/2007 | Watson | |
| 2007/0242826 A1 | 10/2007 | Rassool | |
| 2007/0250716 A1 | 10/2007 | Brunk et al. | |
| 2007/0274523 A1 | 11/2007 | Rhoads | |
| 2007/0276925 A1 | 11/2007 | La Joie et al. | |
| 2007/0276926 A1 | 11/2007 | La Joie et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0019560 A1 | 1/2008 | Rhoads | |
| 2008/0022114 A1 | 1/2008 | Moskowitz | |
| 2008/0027734 A1 | 1/2008 | Zhao et al. | |
| 2008/0028223 A1 | 1/2008 | Rhoads | |
| 2008/0028474 A1 | 1/2008 | Horne et al. | |
| 2008/0040354 A1 | 2/2008 | Ray et al. | |
| 2008/0059160 A1 | 3/2008 | Saunders et al. | |
| 2008/0065507 A1 | 3/2008 | Morrison et al. | |
| 2008/0077956 A1 | 3/2008 | Morrison et al. | |
| 2008/0082510 A1 | 4/2008 | Wang et al. | |
| 2008/0082922 A1 | 4/2008 | Biniak et al. | |
| 2008/0083003 A1 | 4/2008 | Biniak et al. | |
| 2008/0133223 A1 | 6/2008 | Son et al. | |
| 2008/0137749 A1 | 6/2008 | Tian et al. | |
| 2008/0139182 A1 | 6/2008 | Levy et al. | |
| 2008/0140573 A1 | 6/2008 | Levy et al. | |
| 2008/0168503 A1 | 7/2008 | Sparrell | |
| 2008/0209219 A1 | 8/2008 | Rhein | |
| 2008/0209491 A1 | 8/2008 | Hasek | |
| 2008/0215333 A1 | 9/2008 | Tewfik et al. | |
| 2008/0219496 A1 | 9/2008 | Tewfik et al. | |
| 2008/0235077 A1 | 9/2008 | Harkness et al. | |
| 2009/0007159 A1 | 1/2009 | Rangarajan et al. | |
| 2009/0031134 A1 | 1/2009 | Levy | |
| 2009/0070408 A1 | 3/2009 | White | |
| 2009/0070587 A1 | 3/2009 | Srinivasan | |
| 2009/0119723 A1 | 5/2009 | Tinsman | |
| 2009/0125310 A1 | 5/2009 | Lee et al. | |
| 2009/0150553 A1 | 6/2009 | Collart et al. | |
| 2009/0193052 A1* | 7/2009 | FitzGerald et al. | 707/102 |
| 2009/0259325 A1 | 10/2009 | Topchy et al. | |
| 2009/0265214 A1 | 10/2009 | Jobs et al. | |
| 2009/0307061 A1 | 12/2009 | Monighetti et al. | |
| 2009/0307084 A1 | 12/2009 | Monighetti et al. | |
| 2010/0008500 A1 | 1/2010 | Lisanke et al. | |
| 2010/0135638 A1 | 6/2010 | Mia | |
| 2010/0166120 A1 | 7/2010 | Baum et al. | |
| 2010/0223062 A1 | 9/2010 | Srinivasan et al. | |
| 2010/0268573 A1 | 10/2010 | Jain et al. | |
| 2011/0224992 A1 | 9/2011 | Chaoui et al. | |
| 2012/0239407 A1 | 9/2012 | Lynch et al. | |
| 2012/0278651 A1 | 11/2012 | Muralimanohar et al. | |
| 2013/0096706 A1 | 4/2013 | Srinivasan et al. | |
| 2013/0144631 A1 | 6/2013 | Miyasaka et al. | |
| 2014/0026159 A1* | 1/2014 | Cuttner | G06Q 30/0241 725/19 |
| 2014/0189724 A1 | 7/2014 | Harkness et al. | |
| 2014/0226814 A1 | 8/2014 | Fernando | |

(56) References Cited

U.S. PATENT DOCUMENTS

| | | |
|---|---|---|
| 2015/0039321 A1 | 2/2015 | Neuhauser et al. |
| 2015/0039322 A1 | 2/2015 | Lynch et al. |
| 2015/0039972 A1 | 2/2015 | Lynch et al. |
| 2015/0221312 A1 | 8/2015 | Lynch et al. |

FOREIGN PATENT DOCUMENTS

| | | |
|---|---|---|
| AU | 2003230993 | 11/2003 |
| AU | 2006203639 | 9/2006 |
| BR | 0112901 | 6/2003 |
| BR | 0309598 | 2/2005 |
| CA | 2483104 | 11/2003 |
| CN | 1149366 | 5/1997 |
| CN | 1372682 | 10/2002 |
| CN | 1592906 | 3/2005 |
| CN | 1647160 | 7/2005 |
| CN | 101243688 | 8/2008 |
| EP | 0769749 | 4/1997 |
| EP | 1267572 A2 | 12/2002 |
| EP | 1349370 | 10/2003 |
| EP | 1406403 | 4/2004 |
| EP | 1307833 | 6/2006 |
| EP | 1703460 | 9/2006 |
| EP | 1745464 | 10/2007 |
| EP | 1704695 | 2/2008 |
| EP | 1504445 | 8/2008 |
| EP | 2487858 | 8/2012 |
| JP | 2001040322 | 8/2002 |
| JP | 2002247610 | 8/2002 |
| JP | 2003208187 A | 7/2003 |
| JP | 2003536113 A | 12/2003 |
| JP | 2006154851 | 6/2006 |
| JP | 2007318745 A | 12/2007 |
| WO | 9527349 A1 | 10/1995 |
| WO | 9702672 | 1/1997 |
| WO | 0004662 | 1/2000 |
| WO | 0019699 | 4/2000 |
| WO | 0119088 | 3/2001 |
| WO | 0124027 | 4/2001 |
| WO | 0131497 | 5/2001 |
| WO | 0140963 | 6/2001 |
| WO | 0153922 | 7/2001 |
| WO | 0175743 | 10/2001 |
| WO | 0191109 | 11/2001 |
| WO | 0205517 | 1/2002 |
| WO | 0211123 | 2/2002 |
| WO | 0215081 | 2/2002 |
| WO | 0217591 | 2/2002 |
| WO | 0219625 | 3/2002 |
| WO | 0227600 | 4/2002 |
| WO | 0237381 | 5/2002 |
| WO | 0245034 | 6/2002 |
| WO | 02061652 | 8/2002 |
| WO | 02065305 | 8/2002 |
| WO | 02065318 | 8/2002 |
| WO | 02069121 | 9/2002 |
| WO | 03009277 | 1/2003 |
| WO | 03091990 | 11/2003 |
| WO | 03094499 | 11/2003 |
| WO | 03096337 | 11/2003 |
| WO | 2004010352 | 1/2004 |
| WO | 2004040416 | 5/2004 |
| WO | 2004040475 | 5/2004 |
| WO | 2005025217 | 3/2005 |
| WO | 2005064885 | 7/2005 |
| WO | 2005101243 | 10/2005 |
| WO | 2005111998 | 11/2005 |
| WO | 2006012241 | 2/2006 |
| WO | 2006025797 | 3/2006 |
| WO | 2007056531 | 5/2007 |
| WO | 2007056532 | 5/2007 |
| WO | 2008042953 | 4/2008 |
| WO | 2008044664 | 4/2008 |
| WO | 2008045950 | 4/2008 |
| WO | 2008110002 | 9/2008 |
| WO | 2008110790 | 9/2008 |
| WO | 2009011206 | 1/2009 |
| WO | 2009061651 | 5/2009 |
| WO | 2009064561 | 5/2009 |
| WO | 2010048458 A3 | 4/2010 |

OTHER PUBLICATIONS

United States Patent and Trademark Office, "Non-Final Office Action," issued in connection with U.S. Appl. No. 12/464,811, Apr. 1, 2013, 23 pages.

United States Patent and Trademark Office, "Final Office Action," issued in connection with U.S. Appl. No. 12/464,811, Dec. 17, 2013, 41 pages.

United States Patent and Trademark Office, "Non-Final Office Action," issued in connection with U.S. Appl. No. 13/955,438, May 22, 2015, 27 pages.

Arbitron, "Critical Band Encoding Technology Audio Encoding System From Arbitron ," Feb. 2008, 27 pages.

United States Patent and Trademark Office, "Non-Final Office Action," issued in connection with U.S. Appl. No. 14/023,226, Jul. 31, 2014, 15 pages.

United States Patent and Trademark Office, "Notice of Allowance," issued in connection with U.S. Appl. No. 14/023,226, Dec. 23, 2014, 23 pages.

United States Patent and Trademark Office, "Non-Final Office Action," issued in connection with U.S. Appl. No. 14/023,221, Jun. 29, 2015, 66 pages.

United States Patent and Trademark Office, "Final Office Action," issued in connection with U.S. Appl. No. 14/023,221, mailed Dec. 3, 2015, 11 pages.

United States Patent and Trademark Office, "Notice of Allowance," issued in connection with U.S. Appl. No. 14/685,984, mailed Dec. 18, 2015, 5 pages.

Patent Cooperation Treaty, "International preliminary report on patentability," issued in connection with Application No. PCT/US2014/049202, mailed on Feb. 11, 2016, 5 pages.

Chinese Patent Office, "Certificate of Grant", issued in connection with Chinese Application No. 12105179.8, mailed on Mar. 18, 2016, 3 pages.

United States Patent and Trademark Office, "Final Office Action," issued in connection with U.S. Appl. No. 12/464,811, Mar. 10, 2016, 14 pages.

U.S. Appl. No. 14/023,221, filed Sep. 10, 2013 (44 pages).

United States Patent and Trademark Office, "Non-Final Office Action," issued in connection with U.S. Appl. No. 14/023,221, mailed Aug. 31, 2016 (13 pages).

United States Patent and Trademark Office, "Non-Final Office Action," issued in connection with U.S. Appl. No. 13/955,438 mailed Sep. 9, 2016 (13 pages).

United States Patent and Trademark Office, "Final Office Action," issued in connection with U.S. Appl. No. 13/955,438 mailed Dec. 4, 2015 (12 pages).

United States Patent and Trademark Office, "Corrected Non-Final Office Action," issued in connection with U.S. Appl. No. 13/955,438 mailed Jun. 2, 2015 (14 pages).

United States Patent and Trademark Office, "Non-Final Office Action," issued in connection with U.S. Appl. No. 14/685,984 mailed Jul. 31, 2015 (5 pages).

United States Patent and Trademark Office, "Notice of Allowance," issued in connection with U.S. Appl. No. 12/464,811, mailed Sep. 23, 2016 (8 pages).

United States Patent and Trademark Office, "Non-Final Office Action," issued in connection with U.S. Appl. No. 12/464,811, Jul. 6, 2015, 52 pages.

\* cited by examiner

SYSTEMS APPARATUS AND METHODS FOR ENCODING/DECODING PERSISTENT UNIVERSAL MEDIA CODES TO ENCODED AUDIO

BACKGROUND INFORMATION

There is considerable interest in identifying and/or measuring the receipt of, and or exposure to, audio data by an audience in order to provide market information to advertisers, media distributors, and the like, to verify airing, to calculate royalties, to detect piracy, and for any other purposes for which an estimation of audience receipt or exposure is desired. Additionally, there is a considerable interest in providing content and/or performing actions on devices based on media exposure detection. The emergence of multiple, overlapping media distribution pathways, as well as the wide variety of available user systems (e.g. PC's, PDA's, portable CD players, Internet, appliances, TV, radio, etc.) for receiving audio data and other types of data, has greatly complicated the task of measuring audience receipt of, and exposure to, individual program segments. The development of commercially viable techniques for encoding audio data with program identification data provides a crucial tool for measuring audio data receipt and exposure across multiple media distribution pathways and user systems.

Recently, advances have been made in creating universal media codes, commonly known as "trackable asset cross-platform identification," (or TAXI) in order to track media assets such as videos, music, advertisements, etc. across multiple platforms. Currently, the Coalition for Innovative Media Measurement (CIMM) is developing TAXI to establish open and interoperable standards upon which incumbent business applications and supporting operational processes can more effectively adapt to the requirements of asset tracking. By utilizing a standardized (universal) cross-platform asset identification techniques, systems may be enabled to simplify a variety of business, technical and operational challenges. Briefly, TAXI is configured to identify entertainment and advertising assets across distribution platforms and establish standards for multi-channel asset tracking. It acts as a UPC code for all audio/video programming and advertising assets, and is based on the entertainment identifier registry (EIDR) and/or Ad-ID formats, among others. It operates to establish cross-sector protocols for video asset registration, ID flow-through and transaction measurement and reporting and may be a foundation layer for many critical content and advertising applications.

One of the issues with standardized cross-platform asset identification technologies is that non-audio identification formats are not easily transposed into audio formats. For example, ID's for media content may contain a code that is non-acoustically encoded as metadata into the content before transmission, broadcast, multicast, etc. One exemplary code, used under the Entertainment Identifier Registry (EIDR) format (http://eidr.org/), utilizes an EMA metadata structure to provide data fields in communicating descriptive, logical, and technical metadata regarding media from content providers. In certain cases, metadata includes elements that cover typical definitions of media, particularly movies and television, and may have two parts, namely, basic metadata and digital asset metadata. Basic metadata includes descriptions such as title and artists. It describes information about the work independent of encoding. Digital Asset metadata describes information about individual encoded audio, video and subtitle streams, and other media included. Package and File Metadata describes a single possible packaging scenario and ties in other metadata types, such as ratings and parental control information. Other types of metadata, such as "common metadata," are designed to provide definitions to be inserted into other metadata systems, such as EIDR metadata and UltraViolet metadata. Downstream users may then define additional metadata to cover areas not included in common metadata.

While such metadata is readily detectable via data connection, it may not be detectible, or may not even exist, in the audio itself. Accordingly, there is a need to provide universal identification codes in audio. Furthermore, as universal identification codes are generally capable of carrying more information than standard audio codes, it would be advantageous to have an encoding system capable of carrying such codes in audio. Such configurations would allow the transposition of non-audio universal codes into audio formats and provide more robust information for audience measurement purposes.

SUMMARY

For this application, the following terms and definitions shall apply, both for the singular and plural forms of nouns and for all verb tenses:

The term "data" as used herein means any indicia, signals, marks, domains, symbols, symbol sets, representations, and any other physical form or forms representing information, whether permanent or temporary, whether visible, audible, acoustic, electric, magnetic, electromagnetic, or otherwise manifested. The term "data" as used to represent predetermined information in one physical form shall be deemed to encompass any and all representations of the same predetermined information in a different physical form or forms.

The term "audio data" as used herein means any data representing acoustic energy, including, but not limited to, audible sounds, regardless of the presence of any other data, or lack thereof, which accompanies, is appended to, is superimposed on, or is otherwise transmitted or able to be transmitted with the audio data.

The term "network" as used herein means networks of all kinds, including both intra-networks, such as a single-office network of computers, and inter-networks, such as the Internet, and is not limited to any particular such network.

The term "processor" as used herein means data processing devices, apparatus, programs, circuits, systems, and subsystems, whether implemented in hardware, tangibly-embodied software, or both.

The terms "communicate" and "communicating" as used herein include both conveying data from a source to a destination, as well as delivering data to a communications medium, system or link to be conveyed to a destination. The term "communication" as used herein means the act of communicating or the data communicated, as appropriate.

The terms "coupled", "coupled to", and "coupled with" shall each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, or (c) a functional relationship in which the operation of any one or more of the relevant devices, apparatus, files, programs, media, components, networks, systems, subsystems, or means depends, in whole or in part, on the operation of any one or more others thereof.

In one or more exemplary embodiment, a method of encoding audio data is disclosed, comprising the steps of receiving a persistent identifier code comprising data for uniquely identifying a media object; generating audio code components comprising frequency characteristics to represent symbols of the persistent identifier code; and psychoacoustically embedding the audio code components into an audio portion of the media object to include the persistent identifier code within one or more of a plurality of encoding layers. The persistent identifier code may comprise a registry prefix and a registry suffix, wherein the registry suffix comprises data uniquely identifying the media object from a plurality of other media objects. The persistent identifier code may be received over a computer network or from a registry database. Alternately, the received persistent identifier code may be detected from a non-audio data portion of the media object.

In one or more other exemplary embodiments, methods for decoding audio data are disclosed comprising the steps of receiving audio data associated with a media object in a device, wherein the audio data comprises a psychoacoustically embedded persistent identifier code comprising data for uniquely identifying the media object; transforming the audio data into a frequency domain; and processing the transformed audio data to detect the persistent identifier code, wherein the persistent identifier code comprises audio code components having frequency characteristics representing symbols of the persistent identifier code, wherein the persistent identifier code is detected from one or more of a plurality of encoded layers within the audio data. Again, the persistent identifier code comprises a registry prefix and a registry suffix, wherein the registry suffix comprises data uniquely identifying the media object from a plurality of other media objects. In some embodiments, metadata may be called from a registry database in response to detecting the persistent identifier code, where the metadata comprises information relating to one or more media object types, media object relationships, descriptive metadata and encoding metadata relating to the media object.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Various embodiments of the present invention will be described herein below with reference to the accompanying drawings. In the following description, well-known functions or constructions are not described in detail since they would obscure the invention in unnecessary detail.

Figure 1:
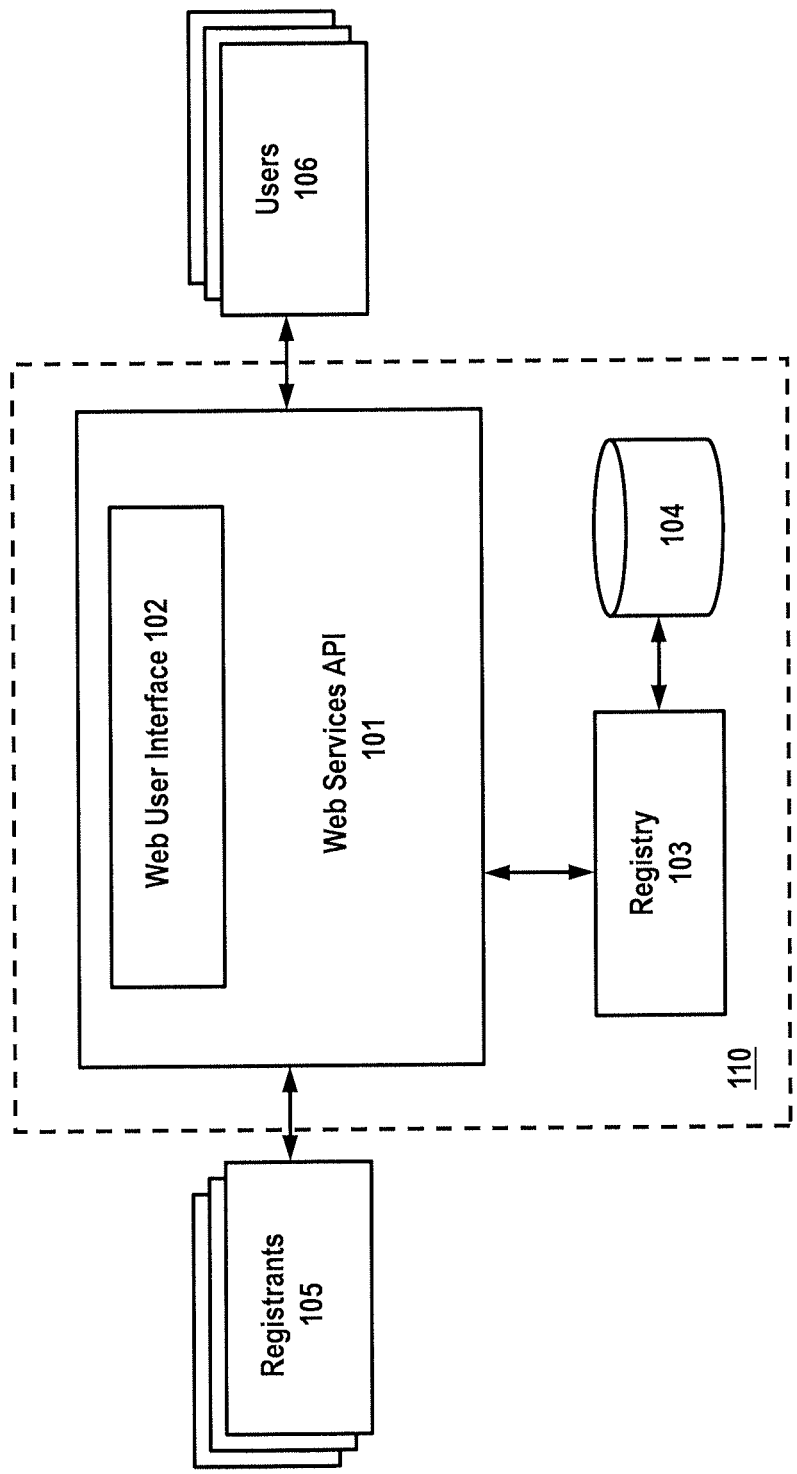
FIG. 1 is a functional block diagram for use in illustrating a system for registering universal codes under an exemplary embodiment.

Turning to FIG. 1, an exemplary embodiment is illustrated for creating and registering universal codes. Universal codes stored (104) in registry 103 a registry are preferably assigned unique universal identifiers for all registered media assets. As used herein, a "media asset" (sometimes referred to herein as a "media object") may comprise any audio, visual, audio/visual, textual, graphical, etc. indicia or object capable of communicating entertainment or informational data to an end-user. Universal codes may comprise an opaque identification containing all information about the registered asset stored in central registry 103. Under a preferred embodiment, an opaque, persistent identifier is used for the universal code, such as numbers or random combinations of letters, which are particularly advantageous as long-term descriptors for information objects because they won't typically contain information that is at risk of becoming untrue later. Under one embodiment, the structure of the code comprises a standard registry prefix, followed by a unique suffix for each media asset and a check digit. The suffix of an media asset ID may be of the form XXXX-XXXX-XXXX-XXXX-XXXX-C, where each "X" is a hexadecimal digit and "C" is a ISO 7064 Mod 37, 36 check character usable to provide a check digit for sequences of characters. The opaque ID structure allows it to be persistent enough to remain the same despite any change in control or ownership of an underlying media asset, which in turn, requires minimal metadata to ensure uniqueness in registry 103 for the full range of media asset types. As a practical matter, regardless of the format actually used, universal codes and communication should conform to the Digital Object Identifier (DOI) standard (http://www.doi.org/) developed by the International Organization for Standardization in its technical committee on identification and description, TC46/SC9 via ISO/DIS 26324 and other related standards.

In the exemplary embodiment of FIG. 1, one or more registrants 105 may provide media objects for registration via a web services application interface (API) 101 via web user interface 102. The media objects may include metadata and information such as the type of object, encoding, format, and relationship to other objects, and may be stored in storage 104 separately, or as a part of registry 103. The metadata preferably includes descriptive information (basic metadata) and encoding information (physical metadata). Basic metadata may include descriptions such as title and artists and describes information about the media asset independent of encoding. Physical metadata describes information about individual encoded audio, video and subtitle streams, and other media included. Other metadata may also be included such as package and file metadata to describe media asset packaging and ties in other metadata types. Ratings and parental control information may also be included as part of the metadata. Under one exemplary embodiment, the metadata complies with the extensible markup language (XML) standard. In another embodiment, metadata may also be provided in a JavaScript Object Notation (JSON) format. When utilizing XML, specific media asset XML structures may be defined by tables, where tables may combine multiple elements and attributes in a single table.

In the embodiment of FIG. 1, a plurality of request classes may be made to the system. One is a "create object" request, which is preferably made through API 101 to create a new object, which may be accompanied by metadata. If the metadata does not describe any existing object, an ID is allocated, and the metadata is stored in the repository and indexed for quick access. Another is a "modify object" request, which typically may include a media asset ID, along with changes or additions to its metadata, which may include both descriptive information and relationship information. The system preferably checks that the changed object will not be a duplicate of any existing object before making the change. Yet another is a "retrieve information" request which may simply take a set of constraints on metadata fields and returns the IDs of objects whose metadata records match the query. Additionally, a retrieve information request may take a media asset ID as input and return information about that ID in a variety of formats/resolutions or information about other objects related to that ID (traversals). Under a preferred embodiment, request classes may be restricted by access control mechanisms to prevent unauthorized access to the system.

Figure 2:
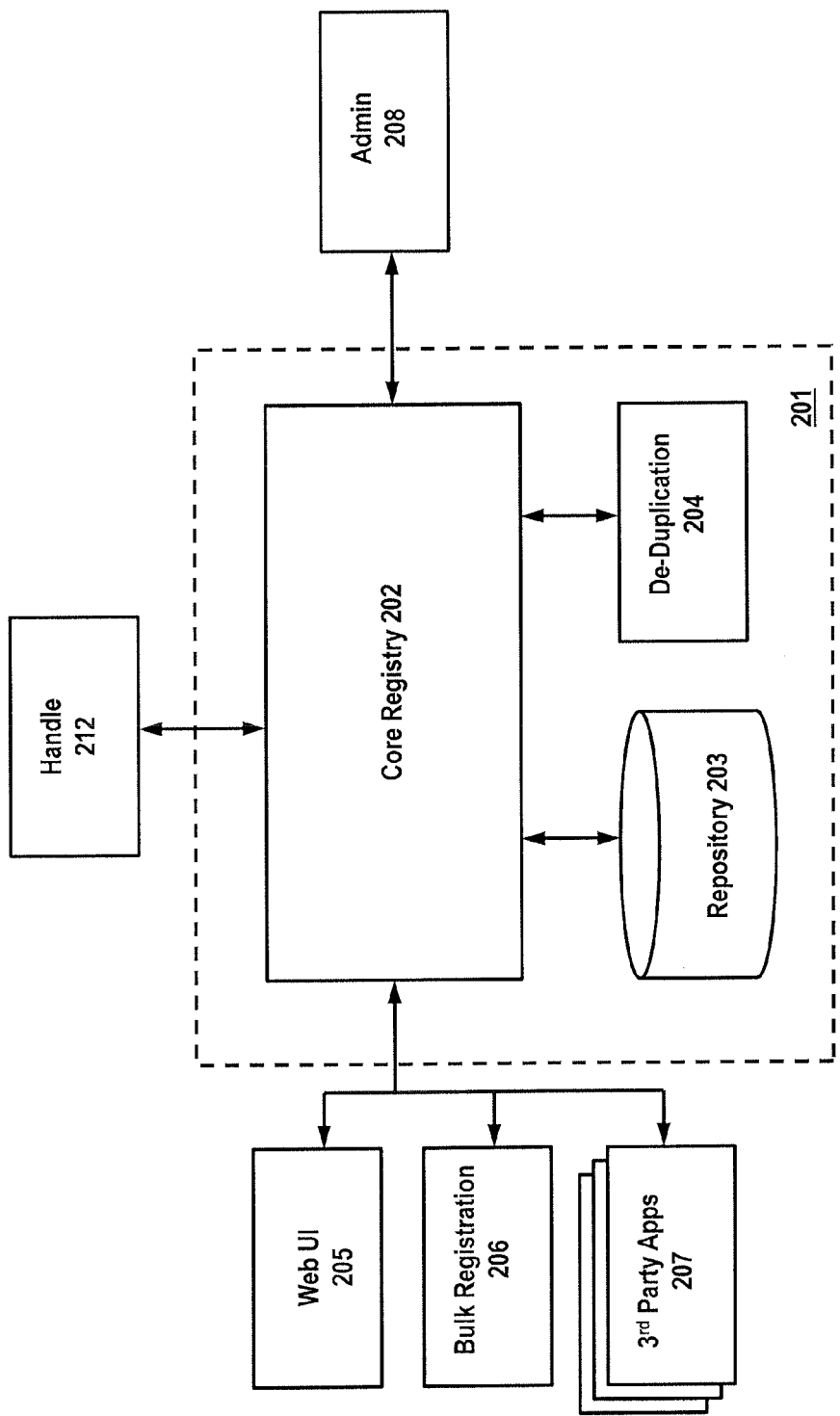
FIG. 2 is a functional block diagram for use in illustrating a system for interfacing a universal code registry with users under one embodiment.

Turning to FIG. 2, another embodiment is provided of an exemplary media asset system architecture, where, just as in FIG. 1, media assets are assigned a unique, universal, persistent identifier, preferably comprising a prefix that specifies a resolution system for the ID, and a suffix that specifies an object within that system. The ID assignments and resolutions are preferably embodied as a Handle System (defined in informational RFCs 3650, 3651 and 3652 of the Internet Engineering Task Force (IETF)) utilizing protocols enabling a distributed computer system to store identifiers (names, or handles), of digital resources and resolve those handles into the information necessary to locate, access, and otherwise make use of the resources. Accordingly, the information can be changed as needed to reflect the current state and/or location of the identified resource without changing the handle.

Handle System 212 in FIG. 2 provides distributed lookup and resolution and enables management of objects as first class entities, rather than as packets of bits, with dependency on other attributes such as locations. Resolution may be thought of as the process in which an identifier is the input request to a network service to receive in return a specific output of one or more items of current information (state data) related to the identified entity. As is known in the art, handle system 212 may comprise global root servers, local handle servers, clients, and proxy servers (not shown for the purposes of brevity). By configuring handle system 212 as a scalable global root infrastructure, users who install local handle services may be enabled to interoperate with the root and each other, depending on permissions that have been established. Additionally, replication servers may be provided for registration entities that operate local handle services, secondary sites, mirrored servers and proxy servers housed at a secure commercial hosting service facility.

Core registry 202 provides a module for customization and configuration of the media asset/object ID repository. Under one embodiment, core registry 202 performs various functions including registration, generation of unique identifiers, indexing, object storage management, and access control. As explained above, each media object is assigned a unique ID upon registration. Media object repository 203 may store and provides access to registered objects, which preferably include collections of metadata, and not necessarily the media assets themselves. The metadata includes standard object information, relationships, and access control settings. De-duplication module 204 is a module that may be called by core registry 202 to check for uniqueness of a newly created or modified object. The de-duplication module provides information in response to a registry request indicating if a record is a duplicate, a potential duplicate, or unique. Core registry 202, media object repository 202 and de-duplication module 204 are preferably embodied in one or more servers 201 or other devices capable of being accessed over a computer network. Core registry 202 preferably contains one or more APIs to allow access to the system.

For example, an administrative API may be provided to allow calls to the system to manage accounts, users and access control lists via an administration console 208. A public API may also be provided for API calls to provide a user interface and allow applications (207) to make requests from the registry. Under one embodiment, the API may be configured under a representational state transfer architecture to provide scalability of component interaction and independent deployment. Service calls may include individual or batched calls. Bulk media asset registrations may done via bulk registration 206, which is preferably configured to submit many (e.g., up to 100,000) registration requests at one time. The system of FIG. 2 may asynchronously accept flat (XML) bulk datasets containing single elements for each row in a dataset, and hierarchical datasets. Web user interface 205 may also be used to support workflows for manual registration and modification, as well as provide a user interface for search and lookup. One example of a user interface may be found at https://ui.eidr.org/.

Under one embodiment, the system of FIG. 2 categorizes media objects by types (such as object type, structural type and referent type) and relationships during the registration process. An object type is preferably configured as an extension of DOI Kernel metadata and may be comprised of "basic types" which cover the object itself, and/or "derived types" which supplement the information in the basic type with information pertaining to more complex objects. Examples of derived types include edit, language variant, series, season, episode, composite, clip, encoding and interactive material. Structural types may be represented as basic metadata field and preferably contain information relating to a media object's abstraction, performance or digital manifestation (e.g., MPEG encoding of a movie). A referent type also may be configured as a metadata field and preferably contains information regarding an object's abstraction independent of the structural type, such as series, season, TV, movie, short, web, etc.

Regarding media object relationships, multiple media objects may be connected to each other metadata, where the relationships may be classified according to inheritance or dependence. For inheritance, a media object on which the relationship exists can inherit basic metadata fields from the object to which the relationship refers. Preferably, objects in the registry are related to each other as nodes in a tree, where items in a tree can inherit certain fields from their parent. For example, all of the seasons and episodes of a series may be related in a tree rooted in the series object. Additional non-parental relationships, such as one object being included in a composite with items from outside its own hierarchy, are also possible. An inheritance relationship may exist on an object on such characteristics as isSeasonOf, isEpisodeOf, isEditOf, isSongOf, isLanguageVariantOf, isEncodingOf, and isClipOf, etc. Regarding dependence, a media object may depend on another object by including a reference to it. For example, when encoding A refers to encoding B by reference, A is dependent on B, and when composite C includes Clip D, C is dependent on D.

Figure 3:
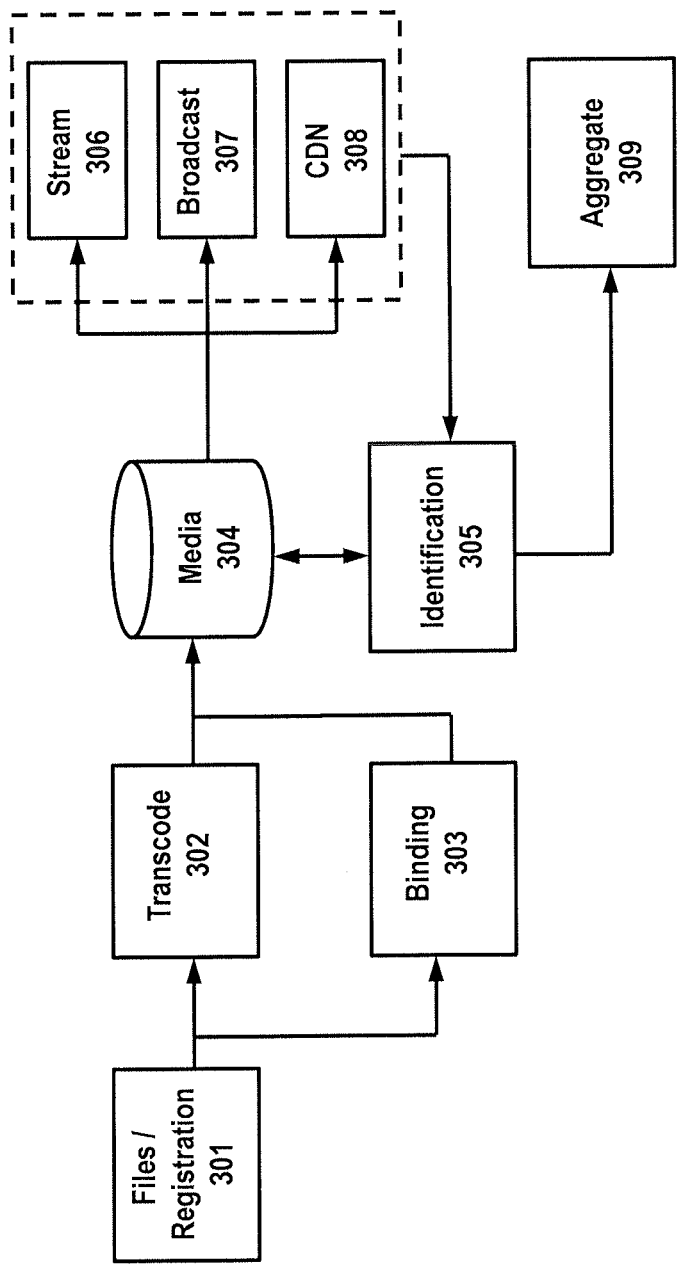
FIG. 3 is a functional block diagram for use in illustrating a system for distributing universal codes over various platforms under one embodiment.

Turning to FIG. 3, another exemplary embodiment is provided for a media distribution system for media assets/objects registered with universal media codes. In this embodiment, media assets are registered, together with any metadata, and stored in 301 utilizing any of the techniques described above in connection with FIGS. 1 and 2. Under a preferred embodiment, registration of media assets in 301 is performed in a production and/or post-production phase of media asset creation. In certain embodiment, media assets may exist as digital masters, compressed files and/or project/source files. In another embodiment, media assets may be produced as mezzanine files, which is a lightly compressed master file that suitable for making additional compressed versions. The use of mezzanine files is popular as they simplify the process for most users. For mezzanine files, a high-quality file is created using minimal compression (e.g., the H.264 codec), but with a high data rate (e.g., higher than a DSLR camera). Accordingly, the file will be smaller and easier to backup, share or transport across a computer network such as the Internet. However, by using a high data rate, the file can still be easily re-compressed for smaller sizes, if necessary. Other processing may be utilized for audio or data files as well. If necessary, transcoding may be performed in 302 to convert the file to a different format of similar or like quality to gain compatibility other programs or applications. The processed media object files may then be stored in media database 304, which may be physically located at an agency, media outlet, or the like, and may be called.

In one embodiment, binding may be performed in 303 prior to storage 304 on a media object that is configured to have additional data embedded into it (e.g., subtitles, text, graphics), and/or is configured to be transmitted across a computer network, such as the Internet. Generally speaking, data binding associates a value from a source object to a property on a destination object. The source property can be any suitable data for binding and the destination can be a dependency property. When using binding techniques based on computer network protocols (e.g., Windows Presentation Foundation (or WPF)), the source and binding to another object type may be configured such that the WPF object has change notification. Thus, once binding has occurred with a WPF element property as a source, when the source changes, the destination property will automatically be updated. Elements can be bound to data from a variety of data sources in the form of common language runtime (CLR) objects and XML. Content control classes such as Button (windows control button) and items controls classes (control that can be used to present a collection of items) such as ListBox (list of selectable items) and ListView (control that displays a list of data items) may be configured with built-in functionality to enable flexible styling of single data items or collections of data items. Sort, filter, and group views can also be generated on top of the data.

Registered media assets in 304 may subsequently be transmitted and/or broadcast to users over different mediums including streaming media, broadcast and content delivery network (CDN), where media asset ID's are collected using suitable ID extraction software tangibly embodied on a processor-based hardware device. In the case of CDNs, media asset IDs are detected in 308 from the server side and/or the user side via beacons, cookies, tags or the like. Media asset IDs from broadcast may be detected in 307 from the user side via set-top-box, intelligent TV and the like via return path, return channel or back channel data. For streaming media, media asset ID's may be detected in 306 (from a server and/or user side) via log panel data or the like.

Figure 4:
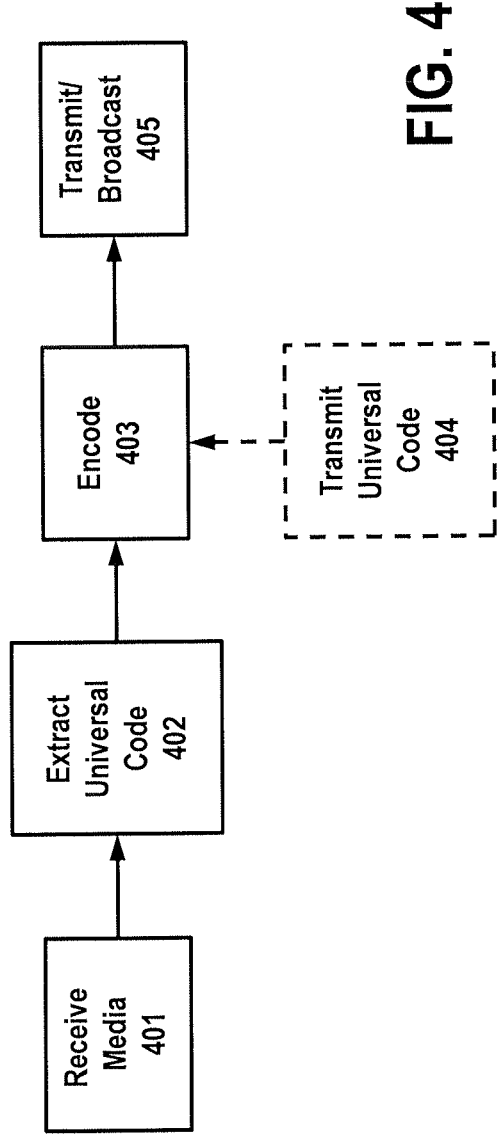
FIG. 4 illustrates the receipt of, or extraction of codes for audio transposition under one embodiment.

Turning to FIG. 4, an embodiment is illustrated for acoustically encoding the aforementioned universal media codes into audio. Unlike traditional audio codes, which contain more limited data and information, universal media codes of the types described above may contain significantly more data and information. In 401, media is received containing media asset IDs embedded in a data layer of the media. This media may be received in any suitable part of a registration and/or distribution system of the kind described above in connection with FIGS. 1-3. After being received universal media codes are detected in 402 and forwarded to an encoder 403 for audio encoding. In one embodiment, universal media codes may be also transmitted 404 from a remote location, such as registry 103 or repository 204 to encoder 403. Once audio encoding is performed in 403, the encoded media is transmitted and/or broadcast in 405. As mentioned above, the audio encoding of universal media codes is particularly advantageous for configurations where universal media asset IDs are not present in the audio domain. It should be understood that an encoded audio source in the embodiment of FIG. 4 may be any external source capable of communicating audio data, including, but not limited to, a radio station, a television station, or a network, including, but not limited to, the Internet, a WAN (Wide Area Network), a LAN (Local Area Network), a PSTN (public switched telephone network), a cable television system, or a satellite communications system. Audio reproduction on devices associated with 306-308 may be any device capable of reproducing audio data from any of the audio sources referenced above, including, but not limited to, a radio, a television, set-top-box, media box, stereo system, a home theater system, an audio system in a commercial establishment or public area, a personal computer, a web appliance, a gaming console, a cell phone, a pager, a PDA (Personal Digital Assistant), an MP3 player, any other device for playing digital audio files, or any other device for reproducing prerecorded media.

Media asset ID codes may be added to the audio data using encoding techniques suitable for encoding audio signals that are reproduced as acoustic energy, such as, for example, the techniques disclosed in U.S. Pat. No. 5,764,763 to Jensen, et al., and modifications thereto, which is assigned to the assignee of the present invention and which is incorporated herein by reference. Other appropriate encoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated herein by reference.

In accordance with certain advantageous embodiments of the invention, this media asset ID code is encoded continuously throughout a time base of a media asset segment. In accordance with certain other advantageous embodiments of the invention, this media asset ID code occurs repeatedly, either at a predetermined interval or at a variable interval or intervals. These types of encoded signals have certain advantages that may be desired, such as, for example, increasing the likelihood that a program segment will be identified when an audience member is only exposed to part of the media asset segment, or, further, determining the amount of time the audience member is actually exposed to the segment. In another advantageous embodiment, media asset ID codes may be broken into multiple segments, where the first of these codes may be a media asset ID code prefix, followed by a media asset ID code suffix, where they may be encoded continuously or repeatedly in a predetermined order or other suitable arrangement. In another advantageous embodiment, the audio data of the media asset may include two (or more) different media asset ID codes. This type of encoded data has certain advantages that may be desired, such as, for example, using the codes to identify two different program types in the same signal, such as a television commercial (e.g., using Ad-ID code format) that is being broadcast along with a movie on a television (e.g., using an EIDR code format), where it is desired to monitor exposure to both the movie and the commercial.

After devices 306, 307 and/or 308 receive the audio data, in certain embodiments, they facilitate reproduction of the audio data as acoustic audio data, and preferably contain decoding hardware and/or software capable of decoding the media asset ID code(s), described in greater detail below in FIG. 6. Alternately, a portable monitoring device, such as Arbitron's PPM™, that is separately wearable by a user, may be configured to detect media asset ID codes. In other embodiments, devices 306, 307 and/or 308 may be configured to communicate the audio data via a connection to the portable monitoring device, or through other wireless means, such as RF, optical, magnetic and/or electrical means. In certain embodiments, the acoustic audio data may be received by a transducer (e.g., microphone) for producing electrical audio data from the received acoustic audio data. It should be understood by those skilled in the art that other means are available for capturing audio data for subsequent universal media ID code extraction such as, for example, a sound card or audio processor, data a magnetic pickup for sensing magnetic fields, a capacitive pickup for sensing electric fields, or an antenna or optical sensor for electromagnetic energy.

Figure 5:
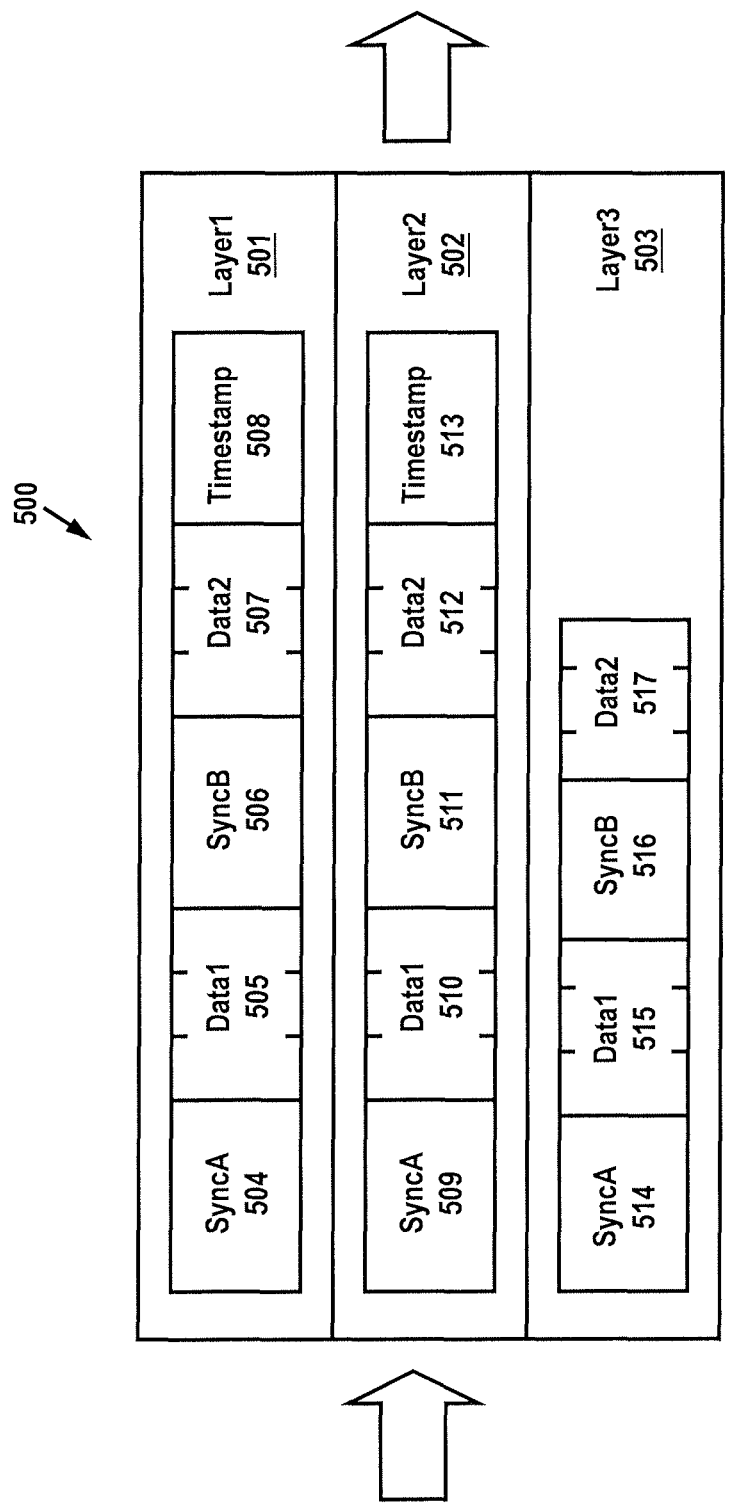
FIG. 5 illustrates an exemplary persistent code message suitable for embedding into audio under one embodiment.

With regard to encoding universal media ID codes into audio, FIG. 5 illustrates an exemplary ID message 500 that may be embedded/encoded into an audio signal. In this embodiment, message 500 (which may be a persistent media identifier code) includes multiple layers that are inserted by encoders in a parallel format. Suitable encoding techniques are disclosed in U.S. Pat. No. 6,871,180, titled "Decoding of Information in Audio Signals," issued Mar. 22, 2005, which is assigned to the assignee of the present application, and is incorporated by reference in its entirety herein. Other suitable techniques for encoding data in audio data are disclosed in U.S. Pat. No. 7,640,141 to Ronald S. Kolessar and U.S. Pat. No. 5,764,763 to James M. Jensen, et al., which are also assigned to the assignee of the present application, and which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

When utilizing a multi-layered message for universal media ID codes, one, two, three or more layers may be present in an encoded data stream, and each layer may be used to convey different data. Turning to FIG. 5, message 500 includes a first layer 501 containing a message comprising multiple message symbols that may correspond to entries in a universal media ID code. During the encoding process, a predefined set of audio tones (e.g., ten) or single frequency code components are added to the audio signal during a time slot for a respective message symbol. At the end of each message symbol time slot, a new set of code components is added to the audio signal to represent a new message symbol in the next message symbol time slot. At the end of such new time slot another set of code components may be added to the audio signal to represent still another message symbol, and so on during portions of the audio signal that are able to psychoacoustically mask the code components so they are inaudible. Preferably, the symbols of each message layer are selected from a unique symbol set. In layer 501, each symbol set includes two synchronization symbols (also referred to as marker symbols) 504, 506, a larger number of data symbols 505, 507, and time code symbols 508. Time code symbols 508 and data symbols 505, 507 are preferably configured as multiple-symbol groups.

Second layer 502 of message 500 is illustrated having a similar configuration to layer 501, where each symbol set includes two synchronization symbols 509, 511, a larger number of data symbols 510, 512, and time code symbols 513. The third layer 503 includes two synchronization symbols 514, 516, and a larger number of data symbols 515, 517. The data symbols in each symbol set for the layers (501-503) should preferably have a predefined order and be indexed (e.g., 1, 2, 3). The code components of each symbol in any of the symbol sets should preferably have selected frequencies that are different from the code components of every other symbol in the same symbol set. Under one embodiment, none of the code component frequencies used in representing the symbols of a message in one layer (e.g., Layer 1 501) is used to represent any symbol of another layer (e.g., Layer2 502). In another embodiment, some of the code component frequencies used in representing symbols of messages in one layer (e.g., Layer3 503) may be used in representing symbols of messages in another layer (e.g., Layer1 501). However, in this embodiment, it is preferable that "shared" layers have differing formats (e.g., Layer3 503, Layer1 501) in order to assist the decoder in separately decoding the data contained therein.

Sequences of data symbols within a given layer are preferably configured so that each sequence is paired with the other and is separated by a predetermined offset. Thus, as an example, if data 505 contains code 1, 2, 3 having an offset of "2", data 507 in layer 501 would be 3, 4, 5. Since the same information is represented by two different data symbols that are separated in time and have different frequency components (frequency content), the message may be diverse in both time and frequency. Such a configuration is particularly advantageous where interference would otherwise render data symbols undetectable. Under one embodiment, each of the symbols in a layer have a duration (e.g., 0.2-0.8 sec) that matches other layers (e.g., Layer1 501, Layer2 502). In another embodiment, the symbol duration may be different (e.g., Layer 2 502, Layer 3 503). During a decoding process, the decoder detects the layers and reports any predetermined segment that contains a code.

Figure 6:
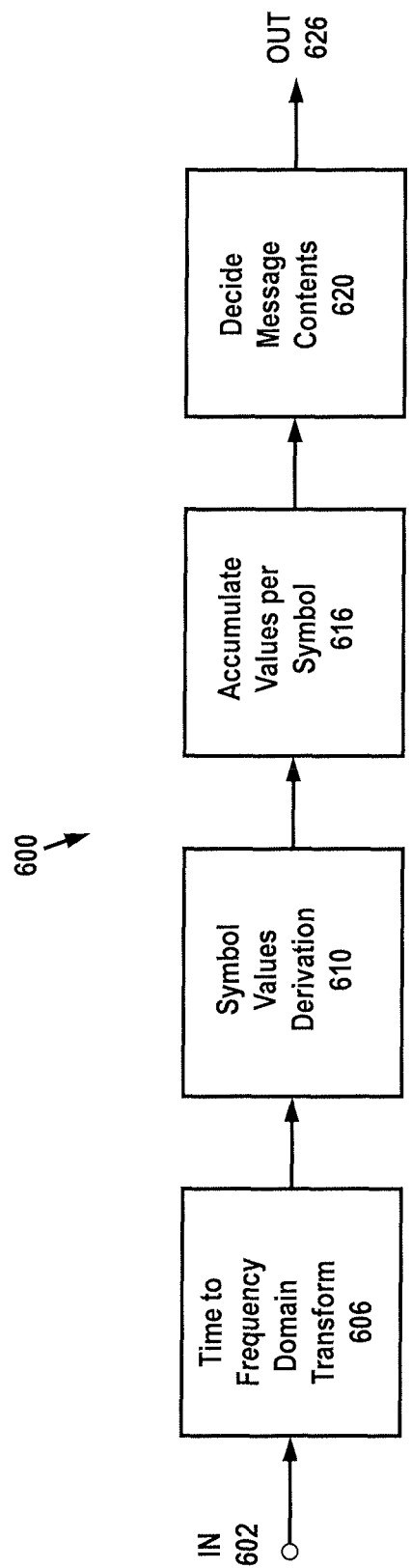
FIG. 6 illustrates an exemplary process for embedding persistent code messages into audio.

FIG. 6 is a functional block diagram illustrating a decoding apparatus under one embodiment. An audio signal which may be encoded as described hereinabove with a plurality of code symbols, is received at an input 602. The received audio signal may be from streaming media, broadcast, otherwise communicated signal, or a signal reproduced from storage in a device. It may be a direct-coupled or an acoustically coupled signal. From the following description in connection with the accompanying drawings, it will be appreciated that decoder 600 is capable of detecting codes in addition to those arranged in the formats disclosed hereinabove.

For received audio signals in the time domain, decoder 600 transforms such signals to the frequency domain by means of function 606. Function 606 preferably is performed by a digital processor implementing a fast Fourier transform (FFT) although a direct cosine transform, a chirp transform or a Winograd transform algorithm (WFTA) may be employed in the alternative. Any other time-to-frequency-domain transformation function providing the necessary resolution may be employed in place of these. It will be appreciated that in certain implementations, functions may also be carried out by filters, by an application specific integrated circuit, or any other suitable device or combination of devices. Function 606 may also be implemented by one or more devices which also implement one or more of the remaining functions illustrated in FIG. 6.

The frequency domain-converted audio signals are processed in a symbol values derivation function 610, to produce a stream of symbol values for each code symbol included in the received audio signal. The produced symbol values may represent, for example, signal energy, power, sound pressure level, amplitude, etc., measured instantaneously or over a period of time, on an absolute or relative scale, and may be expressed as a single value or as multiple values. Where the symbols are encoded as groups of single frequency components each having a predetermined frequency, the symbol values preferably represent either single frequency component values or one or more values based on single frequency component values. Function 610 may be carried out by a digital processor, such as a DSP which advantageously carries out some or all of the other functions of decoder 600. However, the function 610 may also be carried out by an application specific integrated circuit, or by any other suitable device or combination of devices, and may be implemented by apparatus apart from the means which implement the remaining functions of the decoder 600.

The stream of symbol values produced by the function 610 are accumulated over time in an appropriate storage device on a symbol-by-symbol basis, as indicated by function 616. In particular, function 616 is advantageous for use in decoding encoded symbols which repeat periodically, by periodically accumulating symbol values for the various possible symbols. For example, if a given symbol is expected to recur every X seconds, the function 616 may serve to store a stream of symbol values for a period of nX seconds (n>1), and add to the stored values of one or more symbol value streams of nX seconds duration, so that peak symbol values accumulate over time, improving the signal-to-noise ratio of the stored values. Function 616 may be carried out by a digital processor, such as a DSP, which advantageously carries out some or all of the other functions of decoder 600. However, the function 610 may also be carried out using a memory device separate from such a processor, or by an application specific integrated circuit, or by any other suitable device or combination of devices, and may be implemented by apparatus apart from the means which implements the remaining functions of the decoder 600.

The accumulated symbol values stored by the function 616 are then examined by the function 620 to detect the presence of an encoded message and output the detected message at an output 626. Function 620 can be carried out by matching the stored accumulated values or a processed version of such values, against stored patterns, whether by correlation or by another pattern matching technique. However, function 620 advantageously is carried out by examining peak accumulated symbol values and their relative timing, to reconstruct their encoded message. This function may be carried out after the first stream of symbol values has been stored by the function 616 and/or after each subsequent stream has been added thereto, so that the message is detected once the signal-to-noise ratios of the stored, accumulated streams of symbol values reveal a valid message pattern.

The decoding configuration disclosed herein is particularly well adapted for detecting code symbols each of which includes a plurality of predetermined frequency components, e.g. ten components, within a frequency range of 1000 Hz to 3000 Hz. In certain embodiments, the decoder may be designed specifically to detect a message having a specific sequence wherein each symbol occupies a specified time interval (e.g., 0.5 sec). In this exemplary embodiment, it is assumed that the symbol set consists of twelve symbols, each having ten predetermined frequency components, none of which is shared with any other symbol of the symbol set. It will be appreciated that the decoder may readily be modified to detect different numbers of code symbols, different numbers of components, different symbol sequences and symbol durations, as well as components arranged in different frequency bands.

In order to separate the various components, the DSP repeatedly carries out FFTs on audio signal samples falling within successive, predetermined intervals. The intervals may overlap, although this is not required. In an exemplary embodiment, ten overlapping FFT's are carried out during each second of decoder operation. Accordingly, the energy of each symbol period falls within five FFT periods. The FFT's are preferably windowed, although this may be omitted in order to simplify the decoder. The samples are stored and, when a sufficient number are thus available, a new FFT is performed. In this embodiment, the frequency component values are produced on a relative basis. That is, each component value is represented as a signal-to-noise ratio (SNR), produced as follows. The energy within each frequency bin of the FFT in which a frequency component of any symbol can fall provides the numerator of each corresponding SNR Its denominator is determined as an average of adjacent bin values. For example, the average of seven of the eight surrounding bin energy values may be used, the largest value of the eight being ignored in order to avoid the influence of a possible large bin energy value which could result, for example, from an audio signal component in the neighborhood of the code frequency component. Also, given that a large energy value could also appear in the code component bin, for example, due to noise or an audio signal component, the SNR is appropriately limited. In this embodiment, if SNR>6.0, then SNR is limited to 6.0, although a different maximum value may be selected.

The ten SNR's of each FFT and corresponding to each symbol which may be present, are combined to form symbol SNR's which are stored in a circular symbol SNR buffer. In certain embodiments, the ten SNR's for a symbol are simply added, although other ways of combining the SNR's may be employed. The symbol SNR's for each of the twelve symbols are stored in the symbol SNR buffer as separate sequences, one symbol SNR for each FFT for 50 μl FFT's. After the values produced in the 50 FFT's have been stored in the symbol SNR buffer, new symbol SNR's are combined with the previously stored values, as described below. In certain advantageous embodiments, the stored SNR's are adjusted to reduce the influence of noise, although this step may be optional. In this optional step, a noise value is obtained for each symbol (row) in the buffer by obtaining the average of all stored symbol SNR's in the respective row each time the buffer is filled. Then, to compensate for the effects of noise, this average or "noise" value is subtracted from each of the stored symbol SNR values in the corresponding row. In this manner, a "symbol" appearing only briefly, and thus not a valid detection, is averaged out over time.

After the symbol SNR's have been adjusted by subtracting the noise level, the decoder attempts to recover the message by examining the pattern of maximum SNR values in the buffer. In certain embodiments, the maximum SNR values for each symbol are located in a process of successively combining groups of five adjacent SNR's, by weighting the values in the sequence in proportion to the sequential weighting (6 10 10 10 6) and then adding the weighted SNR's to produce a comparison SNR centered in the time period of the third SNR in the sequence. This process is carried out progressively throughout the fifty FFT periods of each symbol. For example, a first group of five SNR's for a specific symbol in FFT time periods (e.g., 1-5) are weighted and added to produce a comparison SNR for a specific FFT period (e.g., 3). Then a further comparison SNR is produced using the SNR's from successive FFT periods (e.g., 2-6), and so on until comparison values have been obtained centered on all FFT periods. However, other means may be employed for recovering the message. For example, either more or less than five SNR's may be combined, they may be combined without weighing, or they may be combined in a non-linear fashion.

After the comparison SNR values have been obtained, the decoder examines the comparison SNR values for a message pattern. Under a preferred embodiment, the synchronization ("marker") code symbols are located first. Once this information is obtained, the decoder attempts to detect the peaks of the data symbols. The use of a predetermined offset between each data symbol in the first segment and the corresponding data symbol in the second segment provides a check on the validity of the detected message. That is, if both markers are detected and the same offset is observed between each data symbol in the first segment and its corresponding data symbol in the second segment, it is highly likely that a valid message has been received. If this is the case, the message is logged, and the SNR buffer is cleared. It is understood by those skilled in the art that decoder operation may be modified depending on the structure of the message, its timing, its signal path, the mode of its detection, etc., without departing from the scope of the present invention. For example, in place of storing SNR's, FFT results may be stored directly for detecting a message.

In another embodiment, decoding/detecting of universal media code ID's may be performed via a DSP, where a repeating sequence of code symbols comprising a marker symbol followed by a plurality of data symbols are detected wherein each of the code symbols includes a plurality of predetermined frequency components and have a predetermined duration (e.g., 0.5 sec) in the message sequence. It is assumed in this example that each symbol is represented by ten unique frequency components and that the symbol set includes twelve different symbols. It is understood that this embodiment may readily be modified to detect any number of symbols, each represented by one or more frequency components. A circular buffer may be employed having a specified width and length (e.g., twelve symbols wide by 150 FFT periods long). Once the buffer is filled, new symbol SNRs each replace what are than the oldest symbol SNR values. In effect, the buffer stores a fifteen second window of symbol SNR values. Once the circular buffer is filled, its contents are examined to detect the presence of the universal media ID. The buffer may be configured to remain full continuously, so that the pattern search for codes may be carried out after every FFT.

In this example, if five symbol message repeats every 2½ seconds, each symbol repeats at intervals of 2½ seconds or every 25 FFT's. In order to compensate for the effects of burst errors and the like, the SNR's R1 through R150 are combined by adding corresponding values of the repeating messages to obtain 25 combined SNR values SNRn, n=1, 2 . . . 25, as follows:

$$SNR_n = \sum_{i=0}^{5} R_{n+25i}$$

Accordingly, if a burst error should result in the loss of a signal interval i, only one of the six message intervals will have been lost, and the essential characteristics of the combined SNR values are likely to be unaffected by this event. Once the combined SNR values have been determined, the decoder detects the position of the marker symbol's peak as indicated by the combined SNR values and derives the data symbol sequence based on the marker's position and the peak values of the data symbols. Once the message has thus been formed, the message is logged. Instead of clearing the buffer, the decoder loads a further set of SNR's in the buffer and continues to search for a message. It will be apparent from the foregoing that the decoder may be modified for different message structures, message timings, signal paths, detection modes, etc., without departing from the scope of the present invention. For example, the buffer may be replaced by any other suitable storage device; the size of the buffer may be varied; the size of the SNR values windows may be varied, and/or the symbol repetition time may vary. Also, instead of calculating and storing signal SNR's to represent the respective symbol values, a measure of each symbol's value relative to the other possible symbols, for example, a ranking of each possible symbol's magnitude, is instead used in certain advantageous embodiments.

In a further variation which is especially useful in audience measurement applications, a relatively large number of message intervals are separately stored to permit a retrospective analysis of their contents to detect a channel change. In another embodiment, multiple buffers are employed, each accumulating data for a different number of intervals for use in the decoding method. For example, one buffer could store a single message interval, another two accumulated intervals, a third four intervals and a fourth eight intervals. Separate detections based on the contents of each buffer are then used to detect a channel change.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
receiving a persistent media identification code including non-acoustically encoded metadata for uniquely identifying a media object, the media object including an audio data portion and a non-audio data portion, the received persistent media identification code being embedded in the non-audio data portion of the media object and absent from the audio data portion of the media object;
transposing the received persistent media identification code including the non-acoustically encoded metadata into an audio format by generating audio code components having respective frequency characteristics to represent symbols of the received persistent media identification code; and
psychoacoustically embedding the generated audio code components into the audio data portion of the media object to include the transposed persistent media identification code within one or more of a plurality of encoding layers of the audio data portion.

2. The method of claim 1, wherein the persistent media identification code is received over a computer network from a registry database, the persistent media identification code including a registry prefix and a registry suffix, the registry suffix including data uniquely identifying the media object from a plurality of other media objects.

3. The method of claim 1, wherein the audio code components include single frequency code components.

4. The method of claim 3, wherein none of the single frequency code components representing respective symbols within a first one of the encoding layers represent any other symbol within any other one of the encoding layers.

5. The method of claim 3, wherein at least one of the single frequency code components representing respective symbols within a first one of the encoding layers represents another symbol within another one of the encoding layers.

6. The method of claim 1, wherein psychoacoustically embedding the generated audio code components into the audio data portion of the media object includes embedding a first synchronization symbol in a first one of the encoding layers and a second synchronization symbol in a second one of the encoding layers, the first and second synchronization symbols including information to enable synchronization of ones of symbols in the first one of the encoding layers with corresponding ones of symbols in the second one of the encoding layers.

7. An apparatus, comprising:
a processor; and
a memory including computer readable instructions which, when executed, cause the processor to at least:
access a persistent media identification code including non-acoustically encoded metadata for uniquely identifying a media object, the media object including an audio data portion and a non-audio data portion, the accessed persistent media identification code being embedded in the non-audio data portion of the media object and absent from the audio data portion of the media object;
transpose the accessed persistent media identification code including the non-acoustically encoded metadata into an audio format by generating audio code components having respective frequency characteristics to represent symbols of the accessed persistent media identification code; and
psychoacoustically embed the generated audio code components into the audio data portion of the media object to include the transposed persistent media identification code within one or more of a plurality of encoding layers of the audio data portion.

8. The apparatus of claim 7, wherein the instructions are to cause the processor to access the persistent media identification code over a computer network from a registry database, the persistent media identification code including a registry prefix and a registry suffix, the registry suffix including data uniquely identifying the media object from a plurality of other media objects.

9. The apparatus of claim 7, wherein the audio code components include single frequency code components.

10. The apparatus of claim 9, wherein none of the single frequency code components representing respective symbols within a first one of the encoding layers represent any other symbol within any other one of the encoding layers.

11. The apparatus of claim 9, wherein at least one of the single frequency code components representing respective symbols within a first one of the encoding layers represents another symbol within another one of the encoding layers.

12. The apparatus of claim 7, wherein the instructions are further to cause the processor to embed a first synchronization symbol in a first one of the encoding layers and a second synchronization symbol in a second one of the encoding layers, the first and second synchronization symbols including information to enable synchronization of ones of symbols in the first one of the encoding layers with corresponding ones of symbols in the second one of the encoding layers.

13. A machine readable storage device or storage disk comprising instructions that, when executed, cause a machine to, at least:
access a persistent media identification code including non-acoustically encoded metadata for uniquely identifying a media object, the media object including an audio data portion and a non-audio data portion, the accessed persistent media identification code being embedded in the non-audio data portion of the media object and absent from the audio data portion of the media object;
transpose the accessed persistent media identification code including the non-acoustically encoded metadata into an audio format by generating audio code components having respective frequency characteristics to represent symbols of the accessed persistent media identification code; and
psychoacoustically embed the generated audio code components into the audio data portion of the media object to include the transposed persistent media identification code within one or more of a plurality of encoding layers of the audio data portion.

14. The storage device or storage disk of claim 13, wherein the instructions are to cause the machine to access the persistent media identification code over a computer network from a registry database, the persistent media identification code including a registry prefix and a registry suffix, the registry suffix including data uniquely identifying the media object from a plurality of other media objects.

15. The storage device or storage disk of claim 13, wherein the audio code components include single frequency code components.

16. The storage device or storage disk of claim 15, wherein none of the single frequency code components representing respective symbols within a first one of the encoding layers represent any other symbol within any other one of the encoding layers.

17. The storage device or storage disk of claim 15, wherein at least one of the single frequency code components representing respective symbols within a first one of the encoding layers represents another symbol within another one of the encoding layers.

18. The storage device or storage disk of claim 13, wherein the instructions are further to cause the machine to embed a first synchronization symbol in a first one of the encoding layers and a second synchronization symbol in a second one of the encoding layers, the first and second synchronization symbols including information to enable synchronization of ones of symbols in the first one of the encoding layers with corresponding ones of symbols in the second one of the encoding layers.

19. The method of claim 1, wherein the persistent media identification code is a persistent universal media identification code for uniquely identifying the media object across a plurality of media distribution platforms.

20. The apparatus of claim 7, wherein the persistent media identification code is a persistent universal media identification code for uniquely identifying the media object across a plurality of media distribution platforms.

21. The storage device or storage disk of claim 13, wherein the persistent media identification code is a persistent universal media identification code for uniquely identifying the media object across a plurality of media distribution platforms.

\* \* \* \* \*